United States Patent [19]

Tampa

[11] Patent Number: 5,100,629

[45] Date of Patent: Mar. 31, 1992

[54] EBULLATED BED GRID PLATE AND SKIRT TO PREVENT FLOW MALDISTRIBUTION AND CATALYST ATTRITION

[75] Inventor: Gene E. Tampa, Wheaton, Ill.

[73] Assignee: Amoco Corporation, Chicago, Ill.

[21] Appl. No.: 429,392

[22] Filed: Oct. 31, 1989

[51] Int. Cl.$^5$ .............................. B01J 8/22; B01J 8/44
[52] U.S. Cl. ................................. 422/140; 261/114.2;
422/143; 422/311
[58] Field of Search ............... 422/140, 143, 144, 311;
261/114.2; 110/245; 122/4 D; 34/57 A; 431/7

[56] References Cited

U.S. PATENT DOCUMENTS

| | | |
|---|---|---|
| 2,077,645 | 4/1937 | Smith et al. .................. 261/114.2 |
| 2,468,508 | 4/1949 | Munday . |
| 2,715,565 | 8/1955 | McKay ........................... 422/143 |
| 2,836,902 | 6/1958 | North . |
| 2,876,079 | 3/1959 | Upchurch et al. . |
| 3,042,498 | 7/1962 | Norman . |
| 3,462,246 | 8/1969 | Copeland . |
| 3,542,523 | 11/1970 | Wall . |
| 4,425,303 | 1/1984 | Schilling et al. . |
| 4,472,358 | 9/1984 | Khudenko . |
| 4,707,340 | 11/1987 | Milligan ......................... 422/143 |
| 4,715,996 | 12/1987 | Lambousy et al. ............ 261/114.2 |

*Primary Examiner*—Peter Kratz
*Attorney, Agent, or Firm*—Thomas W. Tolpin; William H. Magidson; Ralph C. Medhurst

[57] ABSTRACT

An ebullated bed reactor into which is introduced a mixture of a gaseous substance, such as hydrogen-rich gases, and a liquid substance, such as vacuum reduced crude or resid, beneath a grid plate disposed in the reactor. Bubble cap risers extend through the grid plate uniformly transmit this gaseous and liquid substance mixture to a catalyst bed disposed above the grid plate. The grid plate is connected to an inner wall of the reactor so that a leakage path might be formed between the grid plate and the support ring of the reactor wall. A skirt is disposed beneath the grid plate to maintain a portion of the gaseous substance in a specific area beneath the grid plate to allow proper distribution of the gaseous flow through the bubble cap riser assemblies. Thus, the portion of the gaseous substance which is maintained beneath the grid plate is prevented from escaping into the reactor via any space which may appear in the grid plate and outside the area which is surrounded by the skirt.

5 Claims, 3 Drawing Sheets

EBULLATED BED GRID PLATE AND SKIRT TO PREVENT FLOW MALDISTRIBUTION AND CATALYST ATTRITION

FIELD OF THE INVENTION

This invention relates to distribution trays in ebullated bed reactors. More particularly, this invention relates to a distribution tray in an ebullated bed reactor that includes a cylindrical skirt attached to the underside of the tray to maintain a vapor blanket beneath bubble caps disposed in the tray and to prevent a flow maldistribution and catalyst attrition.

BACKGROUND OF THE INVENTION

A resid hydrotreating unit (system) has a series of ebullated bed reactors for processing a resid oil stream, also known as vacuum-reduced crude, residual oil, or unhydrotreated virgin resid. In each reactor, the resid is hydroprocessed (hydrocracked and hydrotreated) in the presence of hydrogen and of a fresh or equilibrium hydrotreating catalyst in order to produce an upgraded effluent product stream. Fresh hydrotreating catalyst may be fed downwardly into the top of the reactor while partially spent catalyst may be withdrawn from the bed of the bottom of the reactor to maintain catalyst inventory constant. A hot resid feed and hydrogen-containing feed gases enter through feed lines in the bottom of the reactor. The entering resid and hydrogen separate within a plenum chamber positioned in the interior of the bottom portion of the ebullated bed reactor.

The oil and gas feed are re-mixed and blended in a homogeneous manner in the slotted risers of the bubble caps. The mixture is distributed over the bottom of a catalyst bed through the bubble caps in order to provide a uniform upward flow pattern through the bed, the upward flow being with enough force to ebullate and expand the catalyst bed. To provide this pattern and insure a uniformity of the homogeneous mixture of oil and gases which flows upwardly, a grid plate is positioned over the oil in the plenum and the catalyst bed in order to help distribute the oil and gas across the cross section of the reactor. The grid also prevents the catalyst from falling into the plenum at the bottom of the reactor. An ebullating pump circulates the liquid, vapor, oil and gas mixture at a rate which is sufficient to lift and expand the catalyst bed from its initial settled level to its steady state expanded and ebullating bed level.

An ebullated or expanded bed reactor relies on a uniform distribution of proper balance between liquid and gas (a foam-like mixture) to maintain a uniformly expanded catalyst bed. The combination of liquid and gas is recycled oil, new feed oil, and hydrogen.

Each piece of the catalyst is a grain which is in the order of 1/16 to ⅛-inch in diameter more or less. Ideally the catalyst bed would expand so uniformly that each and every catalyst grain would be exactly the same distance from all of its neighboring grains. Then, the fluid being processed would bathe the surface of each and every grain in exactly the same manner so that a maximum efficiency of catalyst usage would be obtained.

This idealized expansion of the catalyst does not occur; however, every effort should be made to approach the ideal. Among other things, this means that the mixture of fluid and gas (a foam) in the plenum should enter the catalyst bed as uniformly as possible across the entire lower cross sectional surface of the bed. For example, if the entering fluid should be maldistributed so that more fluid enters, say, the north side of the catalyst bed, as compared to the fluid entering the south side of the bed, any of a great many different adverse effects could be encountered. Convection currents could be set up within the expanded catalyst bed to deflect the stream of processing oil through the bed in some unpredictable manner. One side of the catalyst bed could slump while the other side expands. Coke could form on one side of the bed. Passageways into and through the bed could clog on one side and channels could open on the other side.

In order to properly distribute the fluid and in an effort toward uniformity of the catalytic bed, the fluid entering the catalyst bed is fed through the grid plate which has many holes formed therein and distributed there across. This grid plate arrangement restricts the fluid entering the catalyst bed via the holes which builds a pressure differential (about 3-5 psi) on opposite sides of the grid plate. The pressure differential drives the entering fluid with enough force so that, in theory, a uniform amount of fluid is forced to pass through each grid plate hole depending upon the area of the hole. However, turbulences may build up around the hole to deflect the fluid passing through it.

Among other things, this pressure differential, the restrictions at the surface of the grid plate, and the like causes a blanket of vapor to develop between the grid plate and an underlying surface of liquid oil beneath the plate. This blanket of vapor and oil interface level is established somewhere between the bottom of the riser and the base of the slot in the riser which allows a very uniform distribution of gas and liquid through the risers. However, if the vapor blanket is lost, through a leak in the grid, all the liquid goes through the risers and the vapor by-passes the bubble caps with uneven flow through the various holes in the grid and the above noted and other problems begin to appear in the ebullated bed.

In an effort to maintain the integrity of the vapor blanket, and to avoid the maldistribution at the holes, it has been common practice to extend risers (short pipes) downwardly from each grid plate hole far enough (about 8 to 12 inches) below the underside of the grid to pass through a minimum thickness of the vapor blanket and to be below any turbulent area within the blanket. The length of these riser pipes tends to insure both the continued existence of the vapor blanket and the uniformity of liquid distribution within the catalyst bed. However, the thickness of the blanket and the height of the upper surface level of the liquid tends to fluctuate. Therefore, the bottoms of the riser pipes contains one or more vertical slots which are long enough so that if a raising level of the oil surface should reach the bottom of the riser pipe, the vapor may still enter the riser via the slots.

Ideally, the periphery of the grid plate should be sealed (welded, or the like) to the inside of the reactor housing. However, the thermal expansions and contractions which occur during reactor operation would cause severe stress problems so that welding or another form of sealing is not a very practical option. Therefore, at its periphery, the grid plate is bolted into position to enable it to expand and contract with temperature changes within the reactor. This mode of attachment may lead to cracks or other leakage at or near the periphery of the grid plate. Once even a small leak is formed, the pressure differential on opposite sides of the grid plate disappears. Without a pressure differential, the vapor blanket disappears and liquid begins streaming through the holes in the grid plate.

Because of the relatively large pressure drop across the grid (typically 3-5 psi), velocities through a grid leak can be several hundred feet-per-second. These high vapor velocities could cause the catalyst to elutriate out of the top of the reactor and through the ebullating pump. Once catalyst begins elutriating from the top of the reactor the catalyst may be recycled with a slurry through the ebullating pump causing the catalyst to break up and wear away.

In one case where there was severe elutriating, thermocouples located above the grid plate and within the reactor indicated that most of the flow through the catalyst bed was directed toward the west side and only a little flow was going up the east side of the reactor. Toward the end of the period, one skin thermocouple on the east side registered 830° F. as compared to the normal range of 500°-600° F. for the refractory-lined reactor. Due to a flow maldistribution, catalyst attrition, and the hot spot on the east wall, the plant was shut down and the reactor was opened for inspection.

An inspection of the reactor revealed a 12"×8"×24" mass of hard coke on the east wall above the grid. Moreover, thirty-eight of the ninety-six grid holes were plugged, all on the east side. Finally, large grid leaks were present on the NNW and SSW locations at the grid support ring. Thus, while reactors equipped with grid plates having risers connected therewith provide for the upward movement of an evenly distributed liquid-vapor mixture, it does not address the problems created by one or more grid plate leaks.

U.S. Pat. No. 2,836,902 ('902) discloses a grid and grid sealing arrangement comprising a skirt-like apparatus for supporting the fluid bed within a burning zone and for uniformly distributing combustion air throughout a bed in, for example, the fluid coking process used in the petroleum industry. However, the '902 skirt was developed and specifically designed to allow differences in thermal expansion and contraction in the equipment, while providing support for the grid and preventing passage of gases around the periphery of the grid.

U.S. Pat. Nos. 4,715,996 and 4,753,721 assigned to Amoco Corporation, disclose a bubble cap assembly and feed distributor which are particularly useful for resid hydrotreating.

SUMMARY OF THE INVENTION

Accordingly, an object of the invention is to provide a grid plate design which better prevents flow maldistribution and catalyst attrition in a reactor.

Another object of the invention is to provide a grid plate design which helps maintain a more proper vapor blanket below the grid plate regardless of any leakage which might occur at the periphery of the grid plate or between it and its support ring.

Another object of the invention is to provide a grid plate design that maintains a more normal liquid-vapor flow through the bubble caps.

A further object of the invention is to provide a grid plate design that is simple and inexpensive to construct and which is compatible with any process utilizing an ebullating bed reactor. According to the invention, these and other objects are achieved by a cylindrical skirt welded to the bottom of the grid plate, the skirt surrounding the entire area containing the holes in the grid plate. The circular skirt extends downwardly below the underside of the grid plate for a distance about equal to the downward extension of the bubble cap risers. In one embodiment, the skirt does not include slots. In another embodiment, the bottom of the skirt includes slots which are similar to those found in the bubble cap risers. Both embodiments (slotted and unslotted) may be used in substantially any process which utilizes an ebullating bed reactor including, coal liquefaction and hydrocracking processes and is particularly useful for resid hydrotreating.

The dependent cylindrical skirt acts somewhat the way that an inverted glass acts when its open end is pushed down and into a liquid, air being trapped within the glass. In this case, the material trapped within the skirt is the vapor blanket which is required to maintain a uniform flow through the holes in the grid. In order to accommodate the rising and falling level of the liquid beneath the blanket, the bottom of the skirt may be slotted, if desired, so that there is an entrance at the highest anticipated liquid level.

Between the reactor wall and the outside of the cylindrical skirt, there is an annular blanket of vapor which might be lost if a leak should form in the area of the peripheral clamping of the grid plate. Some liquid would flow through the leak after the blanket disappears. However, this liquid flow would have no effect upon the vapor blanket inside the skirt which is feeding through the holes in the grid plate and into the catalyst bed. While the liquid flowing through the leak in the grid plate is unwanted, it is such a small volume that is can easily be tolerated.

If a grid plate or support ring leak should occur, the material that passes through the leak is most likely to be liquid which is not driven by a high pressure differential. Therefore, the velocity of the liquid flow through the leak is substantially less than it would be if it were a vapor under pressure. There is substantially no elutriated catalyst because the liquid flow is at a low velocity. Thus, vapor spouting, which is known to carry over catalyst in the vapor, is prevented and normal. Efficient liquid-vapor flow through the bubble caps is maintained.

BRIEF DESCRIPTION OF THE DRAWINGS

The inventive device will become more apparent from the following description taken in conjunction with the attached drawings illustrating the preferred embodiments wherein:

In FIG. 1, high or low sulfur resid oil feed, also referred to as sour crude or vacuum-reduced crude, comprising 1000° F. resid (resid oil) and heavy gas oil, is fed into a resid hydrotreating unit ("RHU") 10 along with a hydrogen-rich feed gas. The resid hydrotreating unit comprises a series or set of ebullated (expanded) bed reactors 12. In the reactors, the resid is hydroprocessed (hydrocracked and hydrotreated) in the presence of fresh and/or equilibrium hydrotreating catalyst and hydrogen to produce an upgraded effluent product stream leaving used spent catalyst.

As shown in FIG. 1, the fresh hydrotreating catalyst is fed downwardly into the top of the ebullated bed reactor 12 through a fresh catalyst feedline 14. Hot resid feed containing resid oil and heavy gas oil is fed through a resid feed line 16 and is mixed with hydrogen-containing feed gases from a feed gas line 18 in a common oil-gas feed line 20. The oil and gas feed is directed upwardly in a uniform distribution by an annular feed distributor and header 22 in the lower portion of the reactor 12. The oil and gas flows upwardly through a distributor plate or grid plate 24 into the catalyst bed 26. The distributor plate or grid plate 24 comprises, in part, a bubble tray 28 and numerous bubble cap assemblies 30 which help distribute the oil and gas across the reactor 12 and prevent catalyst from falling into the bottom section of the reactor.

DETAILED DESCRIPTION OF THE INVENTION

Figure 1:
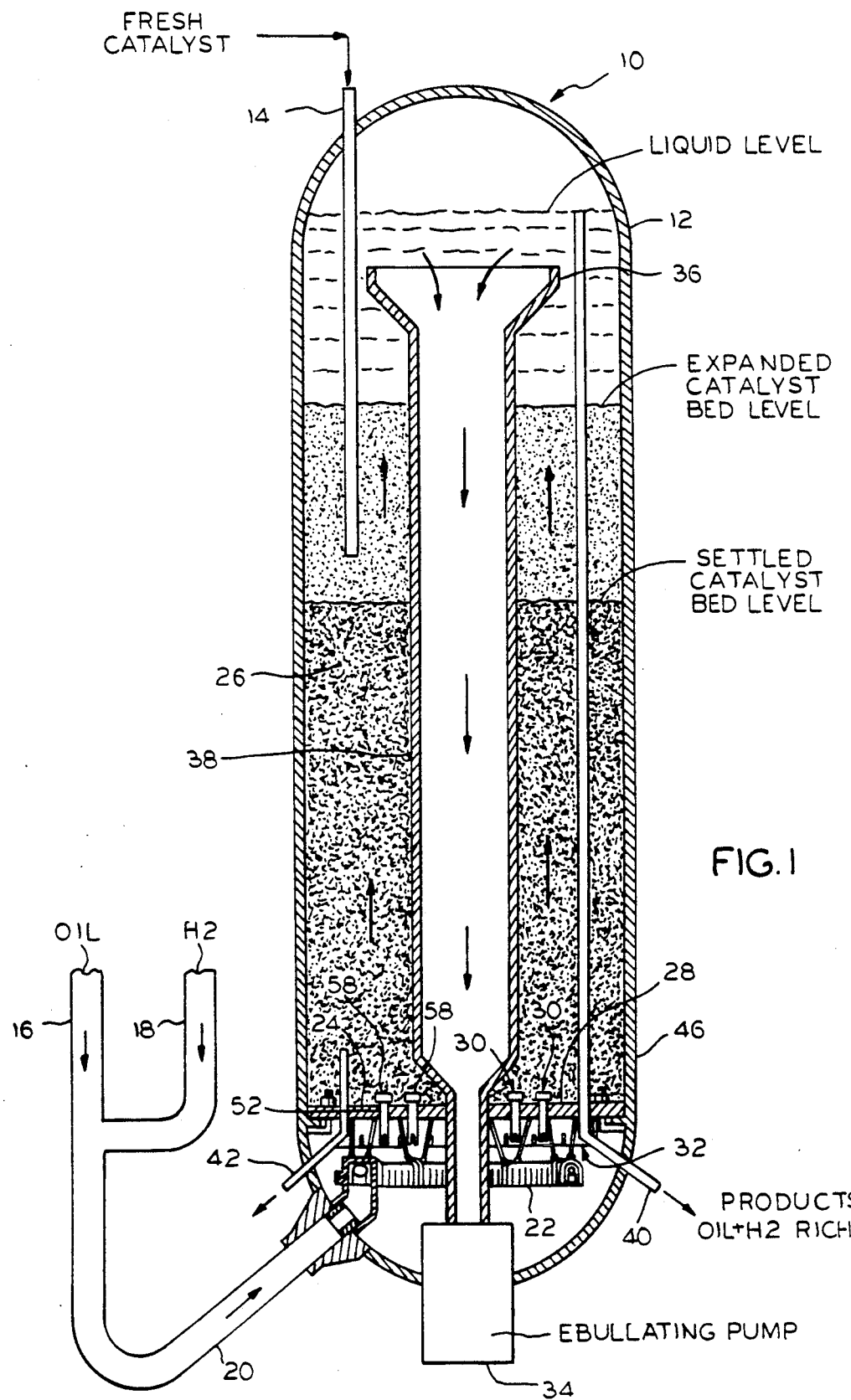
FIG. 1 is a cross-sectional schematic view of a reactor containing the inventive skirt.

In accordance with the present invention, a circular skirt 32 (FIGS. 2, 3) is welded or otherwise attached to the underside of grid plate 24. Skirt 32 forms a peripherally close area with an open bottom for maintaining a proper vapor blanket below the tray 28 and a normal liquid-vapor flow through the bubble cap assemblies 30. The skirt 32 may be fabricated from steel plate, including carbon steel or suitable stainless alloys, for example, to resist corrosion and/or erosion. An ebullating pump 34 (FIG. 1) circulates oil from a recycle pan 36 through a downcomer 38 and the grid plate 24. The rate at which the circulating oil moves is sufficient to lift and expand the catalyst bed from its initial settled level to its steady state expanded level.

The effluent product stream of partially hydrotreated oil and hydrogen-rich reactor tail gases is withdrawn from the reactor through effluent product line 40. The used and spent catalyst is withdrawn from the bottom of the reactor through spent catalyst discharge line 42. The spent catalyst typically contains deposits of metal, such as nickel and vanadium, which have been removed from the incoming feed oil (resid) during hydrotreating.

Figure 2:
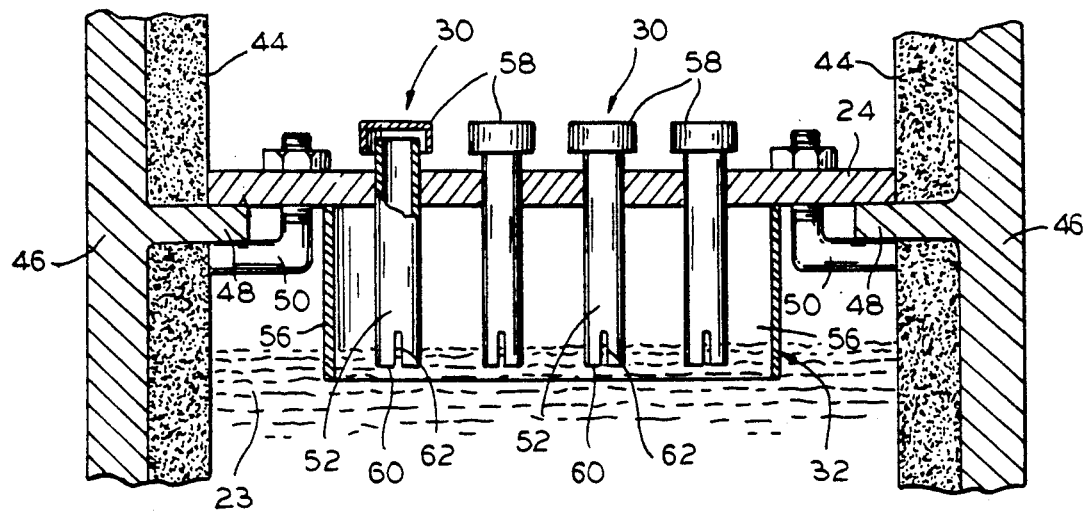
FIG. 2 is a cross-sectional view showing a fragment of the reactor, illustrating the grid plate and unslotted skirt embodiment of FIG. 1 in accordance with principles of the present invention.
Figure 5:
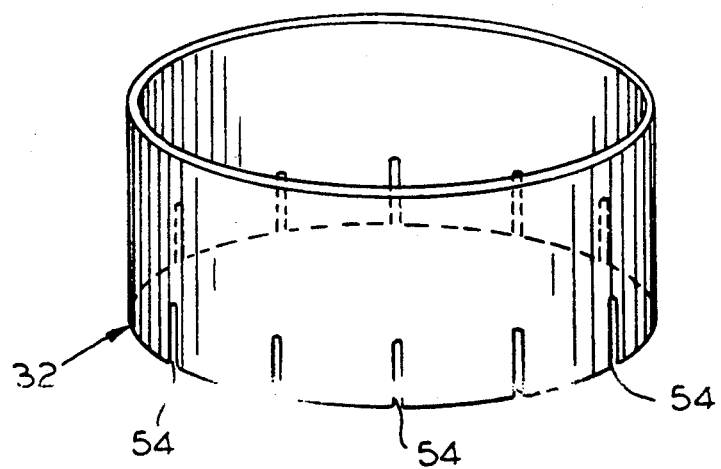
FIG. 5 is a perspective view of the slotted skirt embodiment of the invention as shown in FIG. 3.

As shown in FIG. 2, skirt 32 is welded or otherwise attached to and centered on the underside of grid plate 24. Grid plate 24 extends across the entire cross section of the reactor and ends at its perimeter against the refractory wall 44 of the reactor, which lines the vessel wall 46. Extending outward from and integral with vessel wall 46 is a support ring 48 which supports grid plate 24. Support ring 48 has "J" bolts 50 attached thereto in order to secure grid plate 24 to the support ring. The skirt 32 forms a cylinder below grid plate 24 and is between the "J" bolts 50 which are attached to the periphery of grid plate 24. Skirt 32 extends downwardly over a distance which is approximately equal to the downward extension of the bubble cap risers 52. Skirt 32 has a continuous and unbroken circumferential wall in one of the preferred embodiments. In a second preferred embodiment, skirt 32 includes slots 54 which are formed along the bottom of the circumferential wall, as shown in FIGS. 3 and 5.

Figure 3:
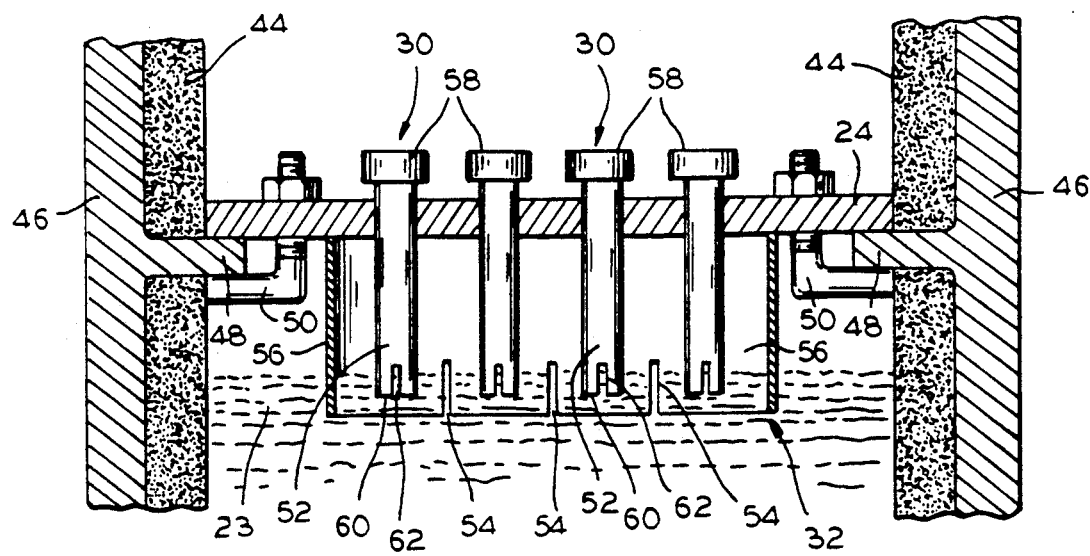
FIG. 3 is another cross sectional view showing a fragment of the reactor illustrating the grid plate and slotted skirt embodiment of FIG. 1.

FIGS. 2 and 3 also illustrate bubble cap assemblies 30, each of which has a vertically elongated tubular riser 52 and a bubble cap 58. Each riser 52 extends upwardly in the reactor, and has an axial inlet opening and mouth 60 for ingress of the oil and gas feed. Preferably, each riser 52 includes a set of upwardly extending elongated inlet slots 62 to help receive the effluent oil and gas feed which moves up the risers 52 and into the bubble caps 58. Skirt 32 prevents vapor from escaping to other areas of the reactor except by a normal upward movement through the bubble caps 58.

Figure 4:
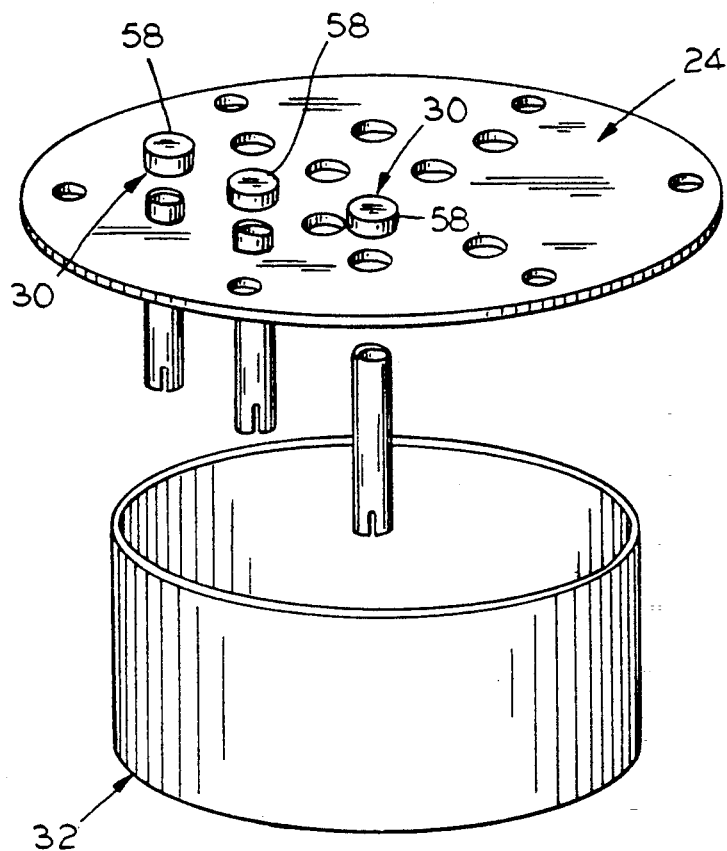
FIG. 4 is an exploded perspective view of the grid plate, bubble cap risers and inventive unslotted skirt of FIG. 1.

FIG. 4 is an exploded view of the grid plate 24, bubble cap assemblies 30 and unslotted skirt 32. As shown, cylindrical skirt 32 is attached to the underside of grid plate 24 to circumscribe the area which supports the bubble cap assemblies 30. FIG. 4 depicts the unslotted skirt embodiment. The slotted skirt 32 of FIG. 5 is the same as the skirt of FIG. 4 except for the addition of the slots 54.

The skirt 32 effectively maintains the vapor blanket beneath bubble cap risers 52 and grid plate 24 in area 56 (FIGS. 2, 3). If a leak occurs at the junction between grid plate 24 and support ring 48, for example, skirt 32 prevents vapor from escaping through the leak. Instead, if anything passes through the leak, it is only a small amount of liquid outside the skirt which passes at a low velocity.

Therefore, it should be recognized that, while the invention has been described in relation to preferred embodiments thereof, those skilled in the art may develop a wide variation of structural details without departing from the principles of the invention. Therefore, the appended claims are to be construed to cover all equivalents falling within the true scope and spirit of the invention.

I claim:

1. An ebullated bed reactor into which is introduced a mixture of a gaseous substance and a liquid substance beneath a grid plate assembly disposed in the reactor, said grid plate assembly comprising a single grid plate at one level and a plurality of bubble cap riser means extending through said grid plate to transmit said gaseous and liquid substance mixture to a catalyst bed disposed above the grid plate; said liquid rising to a level beneath said grid plate and a space defined between said level of said liquid and the underside of said grid plate, said gaseous substance initially disposed in said space, connecting means for attaching the grid plate to an inner wall of the reactor; means disposed beneath the grid plate and extending into said liquid disposed beneath said grid plate for maintaining a portion of the gaseous substance in said space beneath the grid plate prior in time to said portion of the gaseous substance flowing through the bubble cap riser means, whereby the portion of the gaseous substance which is maintained in said space beneath the grid plate is substantially prevented by said maintaining means from escaping through a leak which may appear between the grid plate and the inner wall of the reactor; said means for maintaining a portion of the gaseous substance beneath the grid plate comprising a skirt attached to the underside of the grid plate, said skirt defining a peripherally closed area and having an open bottom and sidewalls spaced inwardly from the inner wall of the reactor and extending downwardly from said grid plate underside to an open area of the reactor containing said liquid whereby said portion of the gaseous substance is maintained in the closed area which is circumscribed by the skirt prior to flowing through the bubble cap riser means.

2. The ebullated bed reactor of claim 1 wherein said bubble cap riser means extends downwardly from said grid, said skirt extending downwardly from said grid plate for a distance which is substantially equal to the downward extent of the bubble riser means from the grid plate.

3. The ebullated bed reactor of claim 1 wherein the skirt circumscribes all of the bubble cap riser means.

4. The ebullated bed reactor of claim 1 wherein the skirt is a cylinder with a continuous and unbroken wall extending around its entire circumference.

5. The ebullated bed reactor of claim 1 wherein the skirt includes slots spacially disposed along a lower portion of the circumference of the skirt.

* * * * *